United States Patent [19]

Dodds

[11] Patent Number: 4,948,307

[45] Date of Patent: Aug. 14, 1990

[54] STRIPPING DEVICE

[76] Inventor: Alan Dodds, 111 Alcoba Street, Kamo, Whangarei, New Zealand

[21] Appl. No.: 337,322

[22] Filed: Apr. 13, 1989

[30] Foreign Application Priority Data

Apr. 18, 1988 [NZ] New Zealand .................. 224279

[51] Int. Cl.$^5$ .............................................. B23C 3/16
[52] U.S. Cl. ............................ 409/136; 51/170 PT; 51/176; 409/139; 409/181; 409/204
[58] Field of Search ............... 409/136, 137, 139, 175, 409/178, 180, 181, 204; 51/170 PT, 176, 267

[56] References Cited

U.S. PATENT DOCUMENTS

| | | | |
|---|---|---|---|
| 2,064,172 | 12/1936 | Lofstedt | 409/136 |
| 2,066,741 | 1/1937 | Ripsch | 409/175 |
| 2,166,861 | 7/1939 | Draheim | 51/170 PT |
| 2,264,278 | 11/1941 | Danforth | 409/178 |
| 3,395,495 | 8/1968 | Powanda | 51/170 PT |

FOREIGN PATENT DOCUMENTS

| | | | |
|---|---|---|---|
| 137874 | 5/1948 | Australia | 409/175 |
| 644011 | 4/1937 | Fed. Rep. of Germany | 409/181 |
| 8580 | 1/1977 | Japan | 409/136 |
| 667723 | 3/1952 | United Kingdom | 409/175 |

*Primary Examiner*—Daniel W. Howell
*Attorney, Agent, or Firm*—Poms, Smith, Lande & Rose

[57] ABSTRACT

A portable, hand-held machine for stripping hard surfaces such as fibreglass boat hulls which have suffered osmotic deterioration. The machine has a hose fed hydraulic motor for outdoor work and a cutter block fitted with rows of tungsten carbide teeth which exert a planing action. Individually adjustable stops control the depth of cut. Trickle feed water arrests dust and prevents clogging. Stripping rates of about 12 m$^2$/hr are sustainable.

17 Claims, 3 Drawing Sheets

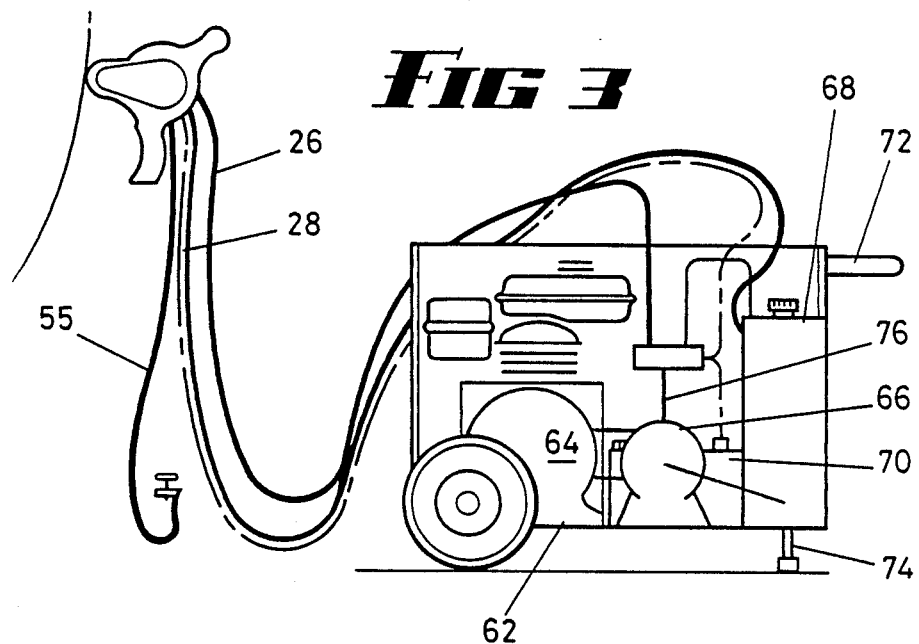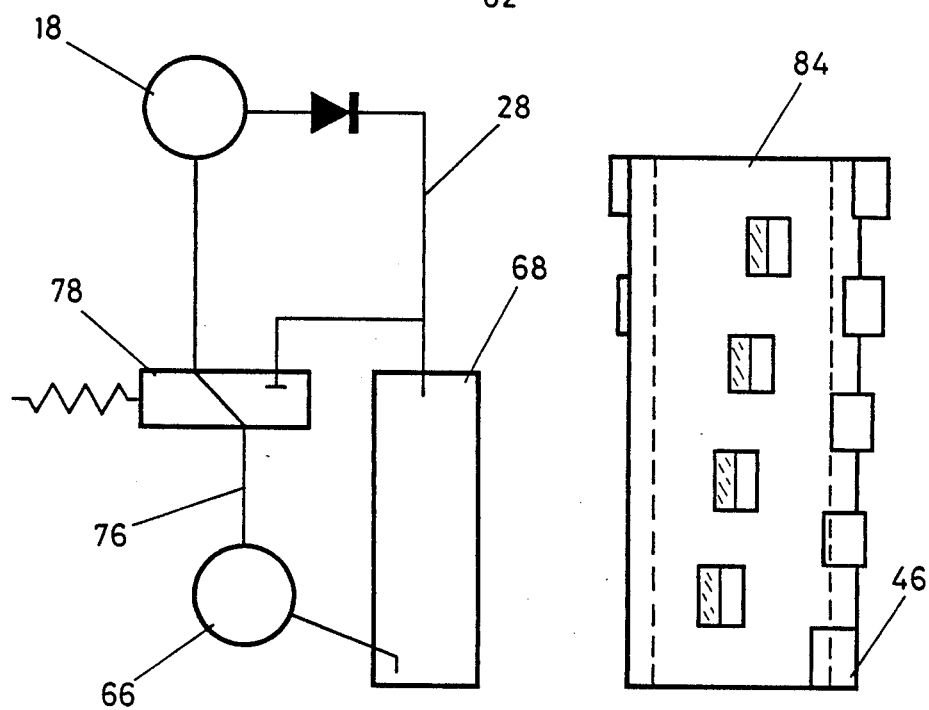

STRIPPING DEVICE

BACKGROUND OF THE INVENTION

1. Field of the Ivention

This invention concerns a stripping device for hard surfaces including hardwoods such as Eucalypts and plastics such as epoxy and polyester resins. A particular application of the device lies in stripping gelcoat together with marine paint layers or cured weatherproof coatings from structures made from glass reinforced plastics (GRP). Marine vessels occupy this category.

Whereas portable buildings made of GRP degrade through exposure to ultraviolet, some GRP boats suffer gradual water permeability which is aggravated in seawater by osmosis. The Gel-Coat skin of the boat ceases to exclude water and eventually a costly hull restoration or replacement becomes necessary.

Likewise swimming pools made of GRP may suffer both ultraviolet degradation and water permeability.

2. Description of Prior Art

Known methods of restoration depend on rubbing away the Gel-Coat with coarse grit abrasive discs or wheels carried by an angle grinder. This operation fills the surrounding air with dust which may contain toxic anti-fouling paints and other hazardous compounds. The person operating the grinder must therefore wear full protective clothing, headgear, eyeshields and breathe filtered air in order to be safe. These precautions preserve only the operator. Toxic or irritant dust may still reach other workers. The dust is still free to penetrate the moving parts of the grinder.

Operators are hampered by such protective aids. The efficiency of abrasion is poor, even using the best discs and wheels but more serious is the difficulty in ensuring that a uniform reduction in thickness is occurring as the job proceeds. Additionally parts of a boat hull have compund curvatures which makes the area accessible to a disc face quite small. Rates of removal are low, typically 2 square meters/hr and the operation is consequently expensive.

Sandblasting leaves a lumpy finish and likewise results in air pollution.

The purpose of the stripping operation is to remove permeable GRP to a depth sufficient to ensure that the new GRP and/or epoxy paint applied on top will constitute an impermeable barrier to seawater.

SUMMARY

This invention provides a rotary stripping device comprising a tool housing, a rotary stripping tool head mounted in the housing having a horizontal axis about which the head is rotatable and being capable of stripping a band of material from a surface to be stripped, drive means for the head, housing-mounted stop means to determine the stripping depth, and flushing liquid delivery means adapted to deliver flushing liquid toward the head.

A cutter block with multiple teeth of tungsten carbide, stellite or diamond tip, cuts well by incising chips from the surface. The liquids flushes debris from both tool and surface. Full width blades strip just as well but pull into the surface and stall the machine. A hydraulic motor delivering 4 HP at the cutter block provides the necessary power to strip GRP.

BRIEF DESCRIPTION OF THE DRAWINGS

FIG. 3 is a diagram (not to scale) of the stripping device connected to a mobile power unit;

FIG. 4 is a hydraulic circuit diagram;

FIG. 5 is a side view of a tool sleeve with helical teeth.

DESCRIPTION OF THE PREFERRED EMBODIMENTS

Figure 1:
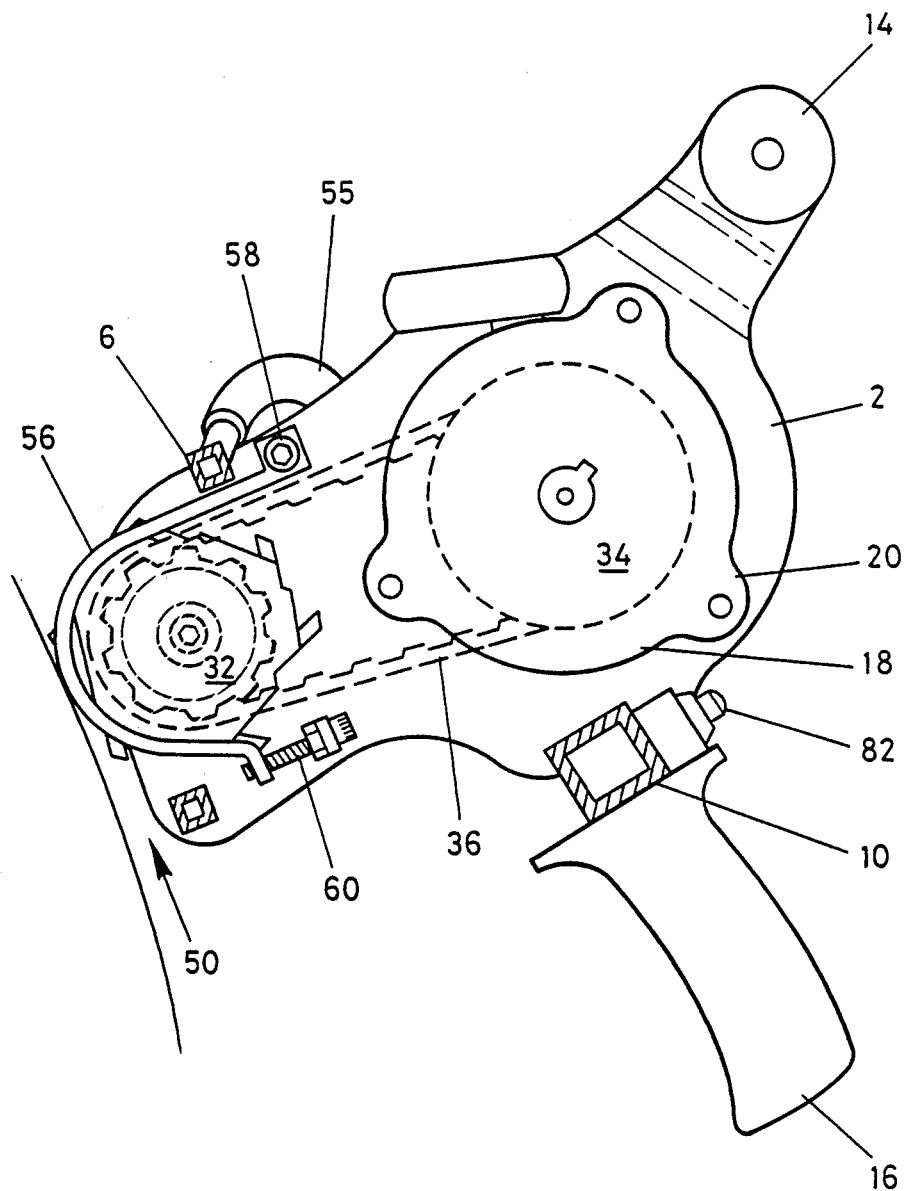
FIG. 1 is a diagrammatic side view with one sideplate removed but a depth stop drawn in to show its position in relation to the tool head.
Figure 2:
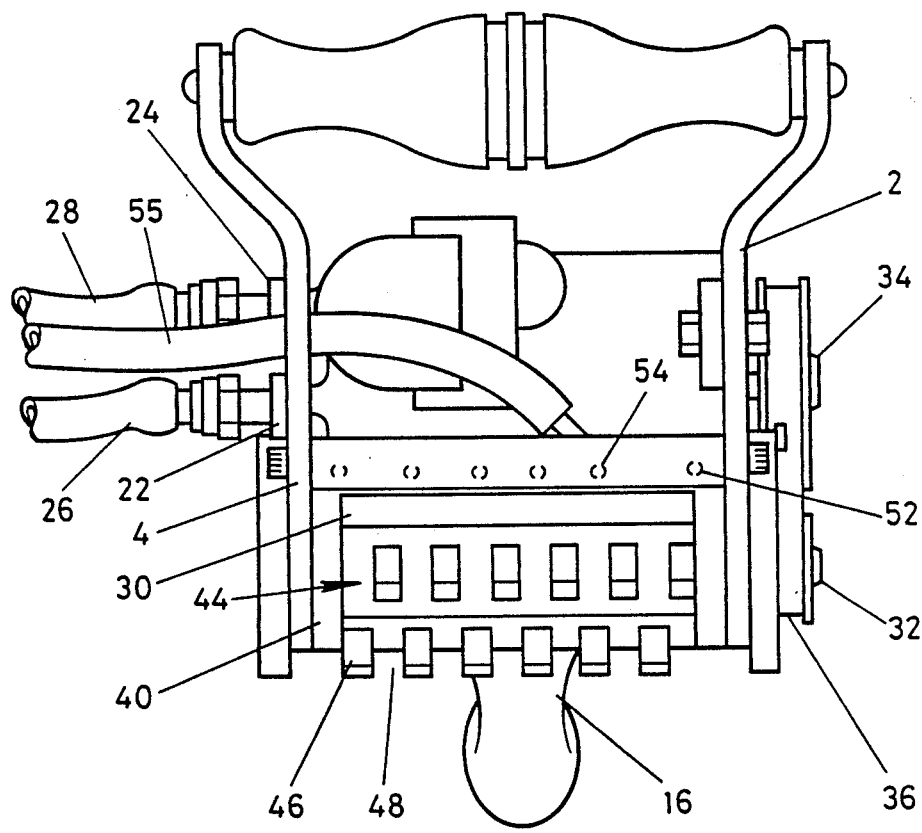
FIG. 2 is a front view with the drive guard removed.

Referring to FIGS. 1 and 2 of the drawings, the tool housing is made of a pair of aluminium sideplates 2,4 joined by tubes 6,8,10. The sideplates are cranked at the rear and further joined by horizontal handle 14. The tool is supported from below by a pistol grip 16 extending from tube 10. Hydraulic motor 18 has flanges 20 by which it is bolted to sideplate 2. Couplings 22,24 extend through sideplate 4 so that connection can be made with hydraulic hoses 26,28. Motor 18 yield 7 kw at 5000 rpm.

The drive shaft of the hydraulic motor 18 drives a tool head or cutter block 30 via step up pulleys 32,34 and toothed belt 36. The cutter block 30 runs in ball bearings (not shown) each located in a housing 40 in each sideplate. The cutter block 30 is 50 mm in dia. and 65 mm long. Hydraulic motors are somewhat heavy (1 kg) for a hand-held tool, but being sealed they suffer least from spray and airborne particles. They are not an electrical hazard and are better suited than a flexible cable drive from a ground based motor. With care, both arrangements could be made to work.

The block is hexagonal in X-section and bears six equi-spaced rows 44 of tungsten caride teeth 46. The teeth are brazed to the block and each tooth is spaced lengthwise from the adjacent tooth by space 48 equal in width to a tooth width. Thus the teeth in row 44 cut between the teeth in the row beneath. The teeth 46 are 4 to 7 mm wide, 8 to 12 mm long and 2 to 4 mm thick. There may be between 2 to 8 rows of teeth 46.

Debris is cleared from the cutting zone 50 by low pressure water supplied through hollow delivery tube 6 which has major ports 52 and minor ports 54. Major ports 52 squirt water between the cutter block 30 and the housings 40. The debris which lodges in the region of the tool head and the stripping zone must be sluiced away as work proceeds, otherwise the teeth clog and the abrasive effect of the debris becomes damaging. Water pressure of about 5 psi, delivered at a rate of 2-3 l/min suffices to entrain debris and rinse the front of the tool clean. Hose 55 supplies delivery tube 6. The cutter block bearings are protected by seals (not shown).

The depth of cut is controlled by a pair of stops, each consisting of a C- shaped steel skid 56, the captive end being located on a pivot post 58 projecting from the sideplates 2,4 while the free end is moved by an adjuster assembly 60 also mounted on the sideplates. Each skid is an arcuate skid which approximates in radius to the radius of the tool head and extends over an arc of 45°-180°.

The stops work independently enabling one skid to ride on the stripped surface while the other rides on the untouched surface. This pomotes orderly progression of the work especially when there is no colour change in the worked surface to guide the operator. Thus the work progresses in 25-50 mm bands in veritcal or diagonal passes from the operator's preferred side. A cut of 0.1-5.0 mm is selected depending upon the desired depth of the material to be stripped. For Gel-Coat a 1 mm cut gives a sustainable stripping rate of about 12 square meters/hr.

The tool weighs about 3½ kg and is comfortably handled by a single operator. It is usual to wear a waterproof one piece suit because the descending trickle of water tends to wet the operator otherwise but no breathing apparatus nor eye protection is needed. Rubber gloves and ear protectors are preferable.

Referring now to FIGS. 3 and 4, the tool has a self-contained mobile power unit consisting of a wheeled chassis 62 which supports a small petrol engine 64, hydraulic pump 66, hydraulic oil reservoir 68 and 12 v battery 70. A handle 72 and leg 74 enables the unit to follow the operator as work on a hull, building, floor or pool proceeds.

Supply conduit 76 from pump 66 divides at spool valve 78 into hydraulic hose 26 and return conduit 28. Hydraulic hose 28 returns oil to the reservoir 68. The solenoid operated valve 78 directs the pump output to DRIVE or DUMP. The 12 v solenoid is operated from the tool by switch 82 (see FIG. 1). An electric flex taped to one hydraulic hose connects battery 70 to the switch 82 and the solenoid of spool valve 78. The handgrip 16 extends from housing 40 perpendicularly to the axis of tool head 30, adjacent the center of gravity of the rotary stripping device. A second hand grip 14 extends substantially parallel to the axis of tool head 30 at the top of housing 40, as seen FIG. 2, and rearwardly of the center of gravity of the rotary stripping device.

In FIG. 5 a sleeve 84 for a cutter block is shown in which the teeth 46 are arranged in helical rows as in milling cutters, for the same purpose. As seen in FIG. 5, the teeth 46 are disposed on the cutter block 84 in at least two rows, the teeth of one row being staggered in relation to the teeth of the adjacent row, the tooth width being greater than the distance separating adjacent teeth in the same row.

The teeth may be replaced by a suitable abrasive such as mineral particles fused to a drum surface.

In use the operator identifies the areas of boat hull which require resurfacing and arranges scaffolding which enables him to apply the tool in the affected area at about chest height. The water flow is adjusted and the waste is caused to drain on to drop sheets laid on the ground. Some initial cutting passes, side by side, are made all 1 mm deep. One skid is adjusted by 1 mm. The initial band acts as a guide when extending the stripped area One skid rides on the fresh surface, the other rides on the cut surface. The operator progresses by repeated parallel passes. The area is worked to the desired depth and fresh fibreglass and resin is applied.

I have found the advantages of the tool to be:
1. Safety
2. Economical cutting rates.
3. Cutting to controlled depth which assists in resurfacing.
4. Operator protection simplified.
5. All removed material can be contained and disposed of.

Having thus desctibed the invention, what is desired to secure and claim by Letters Patent is:

1. A rotary stripping device for stripping boat hulls comprising a tool housing, a rotary stripping tool head mounted in the housing having a horizontal axis about which the head is rotatable and being capable of stripping a band of material from a surface to be stripped, drive means for the tool head, housing-mounted means to determine the depth of strip and flushing liquid delivery means for directing liquid toward the tool head, said tool head being a cylindrical cutter block having a plurality of individual cutting teeth arranged on the block to share the load, said teeth being helically mounted on said block, said adjustable housing-mounted means comprising a pair of independently adjustable arcuate skids captively mounted at one end to said housing arcuately extending around each side of said head with said teeth therebetween, then back to and adjustably mounted at the other end to said housing, the disposition of said teeth on said block providing a radius of cut when said device is actuated, each of said skids being adjustable to lie in advance of the radius of cut.

2. A rotary stripping device as claimed in claim 1 wherein the overall weight of said housing, said tool head, said drive means, said housing-mounted means and said delivery means and the assembly thereof is such that the device can be hand-held and portable.

3. A rotary stripping device as claimed in claim 2 wherein said device has a center of gravity, said device having a first handgrip extending from the housing perpendicularly downward with respect to the tool head axis, adjacent the center of gravity of the device and a second hand grip substantially parallel to the same axis but located at the top of the housing and rearwardly of the center of gravity.

4. A rotary stripping device as claimed in claim 1 wherein the teeth are disposed on the cutter block in at least two spaced rows of spaced apart teeth, the teeth of one row being staggered in relation to the teeth of the adjacent row, each of said teeth having a tooth width greater than the distance separating adjacent teeth in the same row.

5. A rotary stripping tool as claimed in claim 1 wherein said tool head has means thereon adapted to receive a toothed sleeve, said sleeve being detachable so as to receive an exchange sleeve.

6. A rotary stripping device as claimed in claim 1 wherein the drive means is a housing-mounted hydraulic motor which rotates the tool head through stepup pulleys and a toothed belt coupling said pulleys to said motor.

7. A rotary stripping device as claimed in claim 1 wherein each of said teeth are 4-7 mm wide along an axis normal to each tooth's longitudinal axis and 2-4 mm thick from where each of said teeth is connected to said tool head to the upper surface thereof.

8. A rotary stripping device as claimed in claim 1 wherein the tool head has between two to eight rows of teeth.

9. A rotary stripping device as claimed in claim 1 wherein the flushing liquid delivery means comprises a liquid distribution duct arranged adjacent the tool head, said duct defining at least one port therein to direct liquid onto the tool head.

10. A rotary stripping tool as claimed in claim 9 wherein the housing includes a pair of opposed walls which provide mounts for the rotary tool head, the tool head has end faces which in use rotate and each defines a working clearance between the face and the adjacent housing wall and the distributor duct has an outlet which directs liquid into each clearance.

11. A rotary stripping tool as claimed in claim 10 wherein the duct extends between the housing walls and defines a series of outlets facing the tool head for the delivery of liquid into the cutting zone.

12. A rotary stripping device as claimed in claim 1 wherein the housing includes a pair of opposed walls, the walls each having a stop means, said stop means being adjustable to lie in advance of the radius of the tool head.

13. A rotary stripping device as claimed in claim 1 wherein each of said arcuate skids approximates in radius to the radius of the tool head, having a captive end mounted on a housing wall and a free end which is moved by an adjuster on the housing wall.

14. A rotary stripping device as claimed in claim 13 wherein the skid extends over an arc of 45°-180°.

15. A rotary stripping device comprising a tool housing, a rotary stripping tool head mounted in the housing having a horizontal axis about which the head is rotatable and being capable of stripping a band of material from a surface to be stripped, drive means for the tool head, housing-mounted means to determine the depth of strip and flushing liquid delivery means for directing liquid toward the tool head, said flushing liquid delivery means comprising a liquid distribution duct arranged adjacent the tool head, said duct defining at least one port therein to direct liquid onto the too. head, said housing including a pair of opposed walls providing mounts for the rotary tool head, the tool head having end faces which in use rotate and each defines a working clearance between the face and the adjacent housing wall, and the distributor duct having an outlet which directs liquid into each clearance.

16. A rotary stripping tool as claimed in claim 15 wherein the duct extends between the housing walls and defines a series of outlets facing the tool head for the delivery of liquid into the cutting zone.

17. A rotary stripping device comprising a tool housing, a rotary stripping tool head mounted in the housing having a horizontal axis about which the head is rotatable and being capable of stripping a band of material from a surface to be stripped, drive means for the tool head, housing-mounted means to determine the depth of strip and flushing liquid delivery means for directing liquid toward the tool head, said tool head being a cutter block generally cylindrical in cross section having a plurality of individual cutting teeth therearound thereby providing a radius of cut when rotated, the housing including a pair of opposed walls, the walls each having a stop means, said stop means being adjustable to lie in advance of the radius of cut of the tool head.

* * * * *